US010896122B2

(12) United States Patent
Nygaard et al.

(10) Patent No.: US 10,896,122 B2
(45) Date of Patent: **\*Jan. 19, 2021**

(54) USING DIVERGENCE TO CONDUCT LOG-BASED SIMULATIONS

(71) Applicant: Waymo LLC, Mountain View, CA (US)

(72) Inventors: Carl Nygaard, Sunnyvale, CA (US); Yiwen Xu, Sunnyvale, CA (US); James Stout, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,424

(22) Filed: May 20, 2020

(65) Prior Publication Data
US 2020/0349057 A1    Nov. 5, 2020

Related U.S. Application Data

(63) Continuation of application No. 16/056,865, filed on Aug. 7, 2018, now Pat. No. 10,713,148.

(51) Int. Cl.
*G06F 11/36*    (2006.01)
(52) U.S. Cl.
CPC ...... *G06F 11/3664* (2013.01); *G06F 11/3684* (2013.01)
(58) Field of Classification Search
CPC ......... G05D 1/0088; G05D 2201/0213; G05D 1/0061; G06F 17/5009; G06F 11/3604;
(Continued)

(56) References Cited

U.S. PATENT DOCUMENTS

2008/0301651 A1    12/2008  Seneski et al.
2012/0156653 A1     6/2012  Wokurka
(Continued)

FOREIGN PATENT DOCUMENTS

WO    2017210222 A1    12/2017

OTHER PUBLICATIONS

International Search Report and Written Opinion for Application No. PCT/US2019/043881 dated Jun. 25, 2020.
(Continued)

*Primary Examiner* — S. Sough
*Assistant Examiner* — Cheneca Smith
(74) *Attorney, Agent, or Firm* — Botos Churchill IP Law

(57) ABSTRACT

The disclosure relates to testing software for operating an autonomous vehicle. For instance, a first simulation may be run using log data and the software to control a first simulated vehicle. During this, one or more characteristics of the simulated vehicle may be compared with one or more characteristics of a vehicle from the log data. The comparison may be used to determine a divergence point for starting a timer. In addition, a second simulation may be run using the log data and the software to control a second simulated vehicle. The divergence point may be used to determine a handover time to allow the software to take control of the second simulated vehicle. Whether the software is able to continue through the first simulation before the timer expires without a particular type of event occurring and/or the second simulation without the particular type of event occurring is determined.

20 Claims, 12 Drawing Sheets

(58) Field of Classification Search
CPC ............. G06F 11/3668; G06F 11/3664; G06F 11/3684
See application file for complete search history.

(56) References Cited

U.S. PATENT DOCUMENTS

| | | |
|---|---|---|
| 2016/0210382 A1 | 7/2016 | Alaniz et al. |
| 2016/0314224 A1 | 10/2016 | Wei et al. |
| 2018/0157770 A1 | 6/2018 | Kim et al. |
| 2018/0339712 A1 | 11/2018 | Kislovskiy et al. |
| 2019/0220011 A1 | 7/2019 | Della Penna |

OTHER PUBLICATIONS

Neves Vania De Oliveira et al., "An Environment to Support Structural Testing of Autonomous Vehicles", 2014 Brazilian Symposium on Computing Systems Engineering, IEEE, Nov. 3, 2014, pp. 1-6, XP032767533, DOI: 10.1109/SBESC.2014.27.

USING DIVERGENCE TO CONDUCT LOG-BASED SIMULATIONS

CROSS REFERENCE TO RELATED APPLICATIONS

This application is a continuation of U.S. patent application Ser. No. 16/056,865, filed Aug. 7, 2018, the disclosures of which are incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. It is critical that the autonomous control software used by these vehicles to operate in the autonomous mode is tested and validated before such software is actually used to control the vehicles in areas where the vehicles are interacting with other objects.

BRIEF SUMMARY

One aspect of the disclosure provides a method of testing software for operating a vehicle in an autonomous driving mode. The method includes running a first simulation using log data collected by a vehicle operating in an autonomous driving mode, wherein the simulation is run using the software to control a first simulated vehicle; comparing one or more characteristics of the simulated vehicle with one or more characteristics of the vehicle from the log data in order to determine a divergence point; using the divergence point to determine a handover time for a second simulation, the handover time corresponding to a time in the second simulation at which the software is allowed to take control of a second simulated vehicle of the second simulation; running a second simulation using the log data, wherein the second simulation is run using the handover time and the software to control a second simulated vehicle; and determining whether the software is able to complete the second simulation without a particular type of event occurring.

In one example, the particular type of event is a collision, and the method further comprises, when the collision is determined to have occurred, flagging the second simulation for further review. In another example, determining the divergence point includes comparing a planned trajectory of the first simulated vehicle with a planned trajectory of the vehicle from the log data. In this example, determining the divergence point includes determining when one or more of a location, speed or change in speed of the planned trajectory of the first simulated vehicle and the planned trajectory of the vehicle from the log data diverge more than some threshold amount over some period of time. In another example, determining the divergence point includes determining when a location of the first simulated vehicle and a location of the vehicle from the log data diverge more than a threshold amount. In another example, determining the divergence point includes determining when a location of the first simulated vehicle and a location of the vehicle from the log data diverge more than a threshold amount in a lateral direction relative to a direction of traffic in a lane in which the simulated vehicle is traveling in the first simulation. In another example, determining the divergence point includes determining when a location of the first simulated vehicle and a location of the vehicle from the log data diverge more than a threshold amount in a longitudinal direction relative to a direction of traffic in a lane in which the simulated vehicle is traveling in the first simulation. In this example, determining the divergence point includes determining when the location of the first simulated vehicle and the location of the vehicle from the log data diverge more than a threshold amount in a lateral direction relative to the direction of traffic in the lane. In another example, the method also includes, at the divergence point in the first simulation, starting a timer that expires during the first simulation and flagging the first simulation for review when the particular type of event occurs before the timer expires. In this example, the method also includes not flagging the first simulation for review if the particular type of event only occurs during the first simulation after the timer expires. In addition or alternatively, the particular type of event is a collision between the first simulated vehicle and an object in the first simulation. In addition or alternatively, the particular type of event includes the simulated vehicle exhibiting a particular type of maneuvering behavior.

Another aspect of the disclosure provides a method of testing software for operating a vehicle in an autonomous driving mode. The method includes running a simulation using log data collected by a vehicle operating in an autonomous driving mode, wherein the simulation is run using the software to control a simulated vehicle; comparing one or more characteristics of the simulated vehicle with one or more characteristics of the vehicle from the log data in order to determine a divergence point; at the divergence point in the simulation, starting a timer that expires during the simulation; and determining whether the software is able to continue through the simulation without a particular event occurring prior to the timer expiring.

In one example, the particular event is a collision between the simulated vehicle and an object in the simulation. In another example, the method also includes flagging the simulation for review if a particular event occurs before the timer expires. In another example, the method also includes not flagging the simulation for review if the particular event only occurs during the simulation after the timer expires. In another example, the particular event is a collision between the simulated vehicle and an object in the simulation. In another example, the particular event includes the simulated vehicle exhibiting a particular type of maneuvering behavior. In another example, determining the divergence point includes determining when a location of the simulated vehicle and a location of the vehicle from the log data diverge more than a threshold amount. In another example, determining the divergence point includes determining when a location of the simulated vehicle and a location of the vehicle from the log data diverge more than a threshold amount in at least one of a lateral direction or a longitudinal direction relative to a direction of traffic in a lane in which the simulated vehicle is traveling in the simulation.

DETAILED DESCRIPTION

Overview

Figure 1:
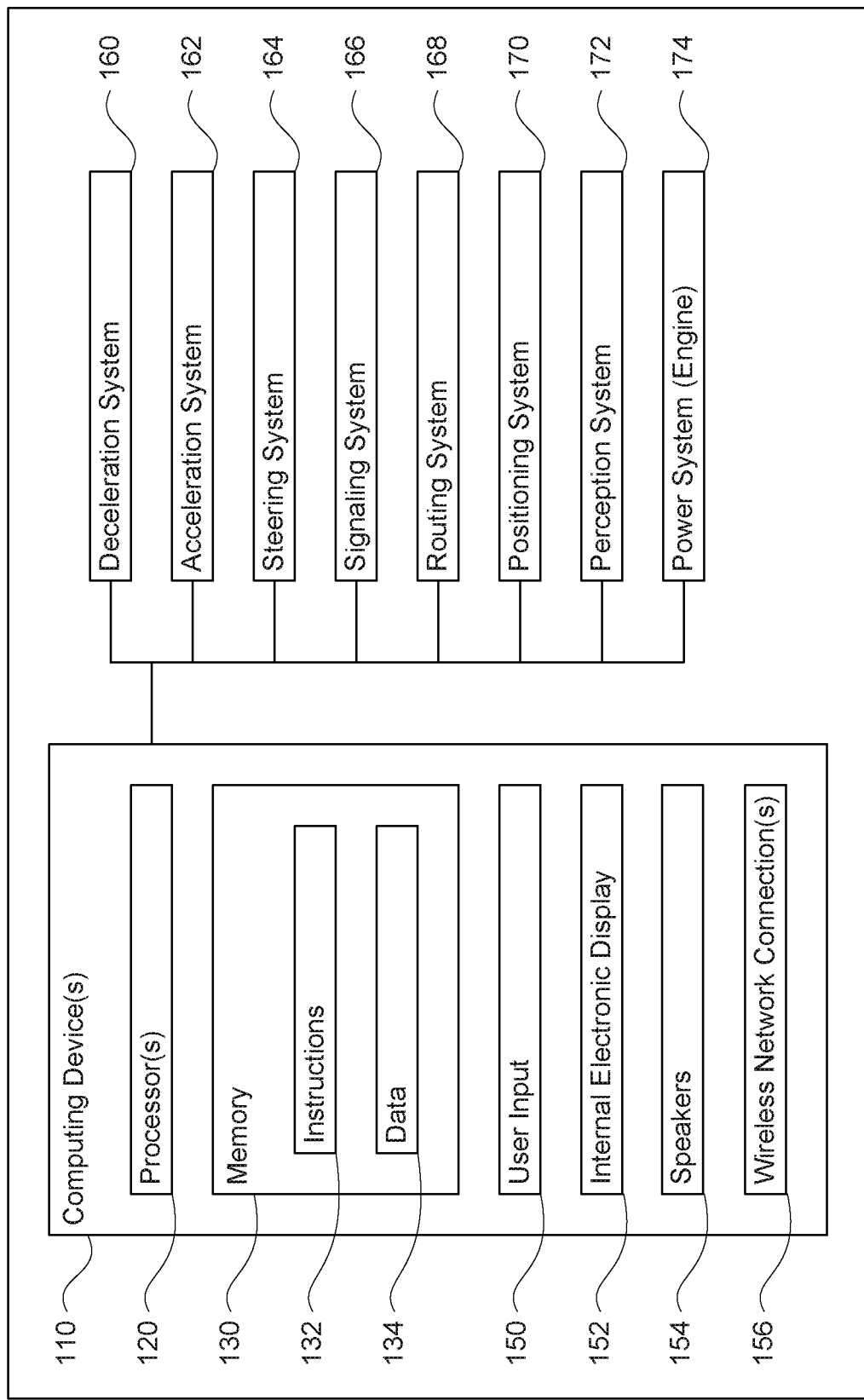
FIG. 1 is a functional diagram of an example vehicle in accordance with an exemplary embodiment.

The technology relates to evaluating collisions in log-based simulations using software for vehicles operating autonomously. The log-based simulations correspond to simulations which are run using log data collected by a vehicle operating in an autonomous mode over some brief period of time such as 1 minute or more or less. The log data may include information from the vehicle's various systems including perception, routing, planning, positioning, etc. At the same time, the actual vehicle is replaced with a virtual autonomous vehicle or a simulated vehicle which can make decisions using software for controlling the vehicle autonomously. By doing so, the software can be rigorously tested. For instance, the simulations may be used to determine whether a particular type of event has occurred, such as a particular type of behavior or collision. As an example, these events may be used for various purposes, such as determining whether the software can "pass" a given simulation without a collision without requiring a vehicle to physically drive "real" miles or having to "manufacture" situations in the real world.

However, when running simulations using logged data, changing the behavior of the autonomous vehicle, such as by testing a different software version than that used to log the log data, can cause unintended consequences. For instance, after only a few seconds of a minute long simulation, the simulated vehicle may diverge in its behavior so much that the purpose of the simulation, to test reaction of the software to a specific situation, is lost because the situation is no longer achievable. This may occur because the agents (or other road users defined in the log data) in the simulation may interfere with the simulated vehicle, for instance, colliding with the simulated vehicle because those agents are behaving as they were observed doing so in the log data. Typically, if the simulation results in a particular type of event, such as a particular type of behavior of the simulated vehicle and/or the simulated vehicle colliding with an agent or other object of the log data, then the simulation may be flagged for review by an operator.

In order to make better use of the log data for simulations, the simulations may be "adjusted" based on how much the behavior of a simulated vehicle diverges from the behavior of the actual vehicle that was used to log the log data. For instance, the "handover time" or the point in which the software is given control of the simulated vehicle may be adjusted. For instance, simulations may be run identically as to how an actual vehicle drove in the log data up until some point of interest or sometime after that point of interest. This point of interest may be a divergence point between a simulated vehicle in a simulation and the actual vehicle that captured the log data.

In one example, the divergence point may be determined by comparing the planned trajectory of the simulated vehicle with the planned trajectory of the actual vehicle identified in the log data. Each planned trajectory may correspond to a combined speed and geometry of a future path or individual geometry and speed profile components. When one or more of a location, speed or change in speed of the planned trajectories diverge more than some threshold amount over some period of time, this may be considered a divergence point.

However, because of the timing requirement for comparing planned trajectories, at least some divergences may not be identified as points of interest. As such, the locations of the simulated vehicle in the simulation and the actual vehicle that captured the log data may be compared. The first point in time in the simulation at which the locations sufficiently diverge may be identified as a divergence point.

This divergence point may then be to determine the handover time for a new simulation using the same log data. This handover time may be the divergence point or the divergence point plus some period of time. In other words, the new simulation forces the simulated vehicle to wait until at least the divergence point before changing its position, speed, orientation, heading, etc. from the log data. If the new simulation results in a particular type of event, such as such as a particular type of behavior of the simulated vehicle and/or the simulated vehicle colliding with an agent or other object of the log data, then the new simulation may be flagged for review by an operator. This process may be repeated until there are no additional points of divergence between the simulated vehicles and the actual vehicle that captured the log data for the simulation.

In addition or alternatively, once the divergence point is identified in a simulation, a timer may be started. After the timer expires, certain events may be ignored. For instance, if simulations are being analyzed to determine when the software is likely to cause the vehicle to behave or maneuver in a particular way or collide with another agent or object, and such events occur after the timer expires, these events may be ignored or not flagged. Thus, such simulations, which would otherwise have been flagged for review by an operator would not be.

The features described herein provide for a safe, effective, and realistic way of testing software for autonomous vehicles. For instance, the software can be tested in hundreds of thousands of scenarios without endangering the life and property of actual persons. At the same time, by making the handover time for a new simulation a divergence point corresponding to a divergence point of a prior simulation, this prevents the simulated vehicle from inadvertently making the simulation less useful. In addition, this approach effectively provides for more realistic responses of the software being tested as well as more valuable and useful simulations out of a fixed amount of log data. In addition, using a timer to determine whether to flag a simulation for review may reduce the time and other resources required to review simulations that are not actually true "fails". In addition, those simulations that are flagged may be more critically important to determining how to revise or update the software being tested. Without such testing, the risks of injury to persons or property using un-tested software may be too great.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
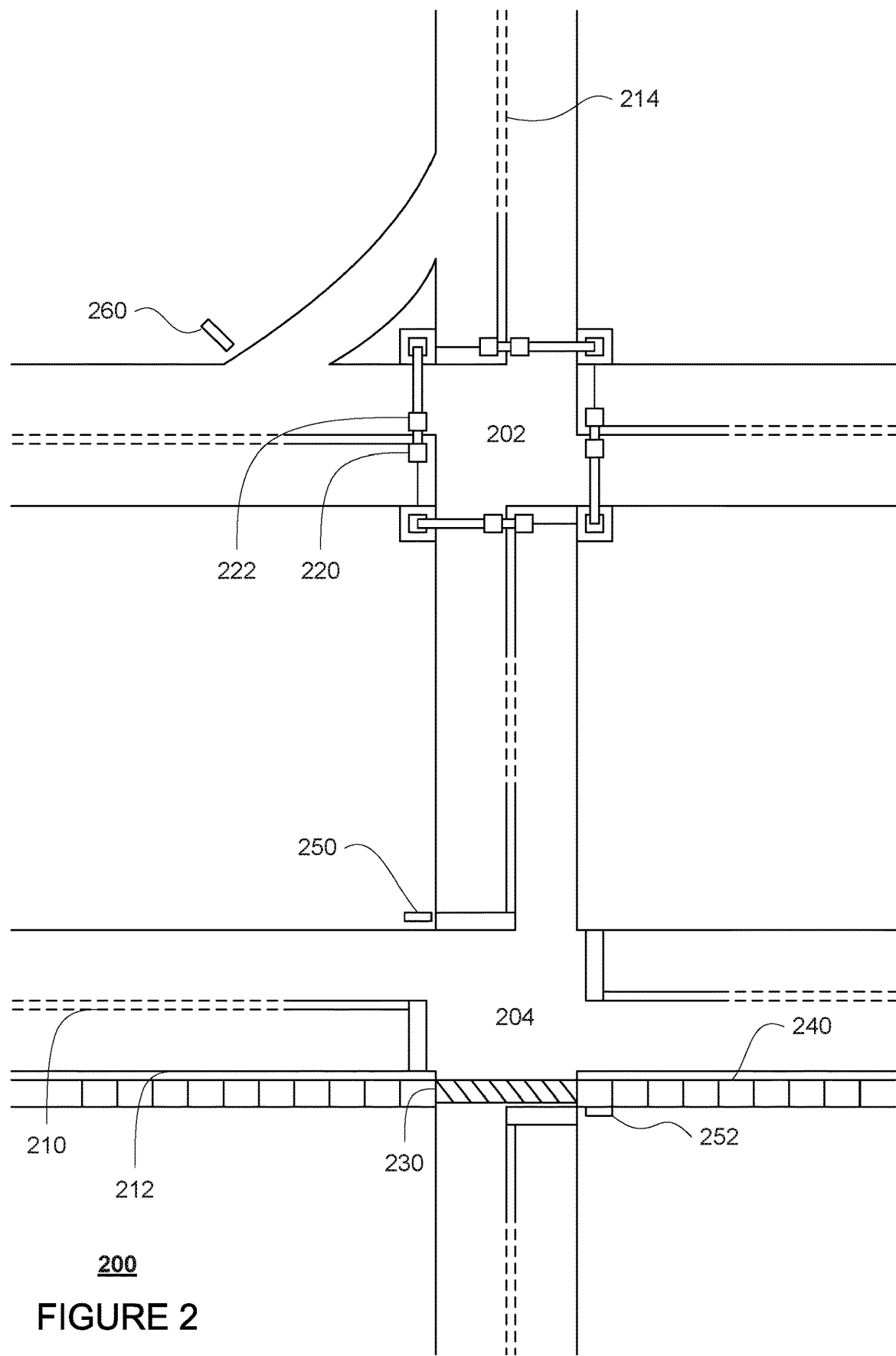
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
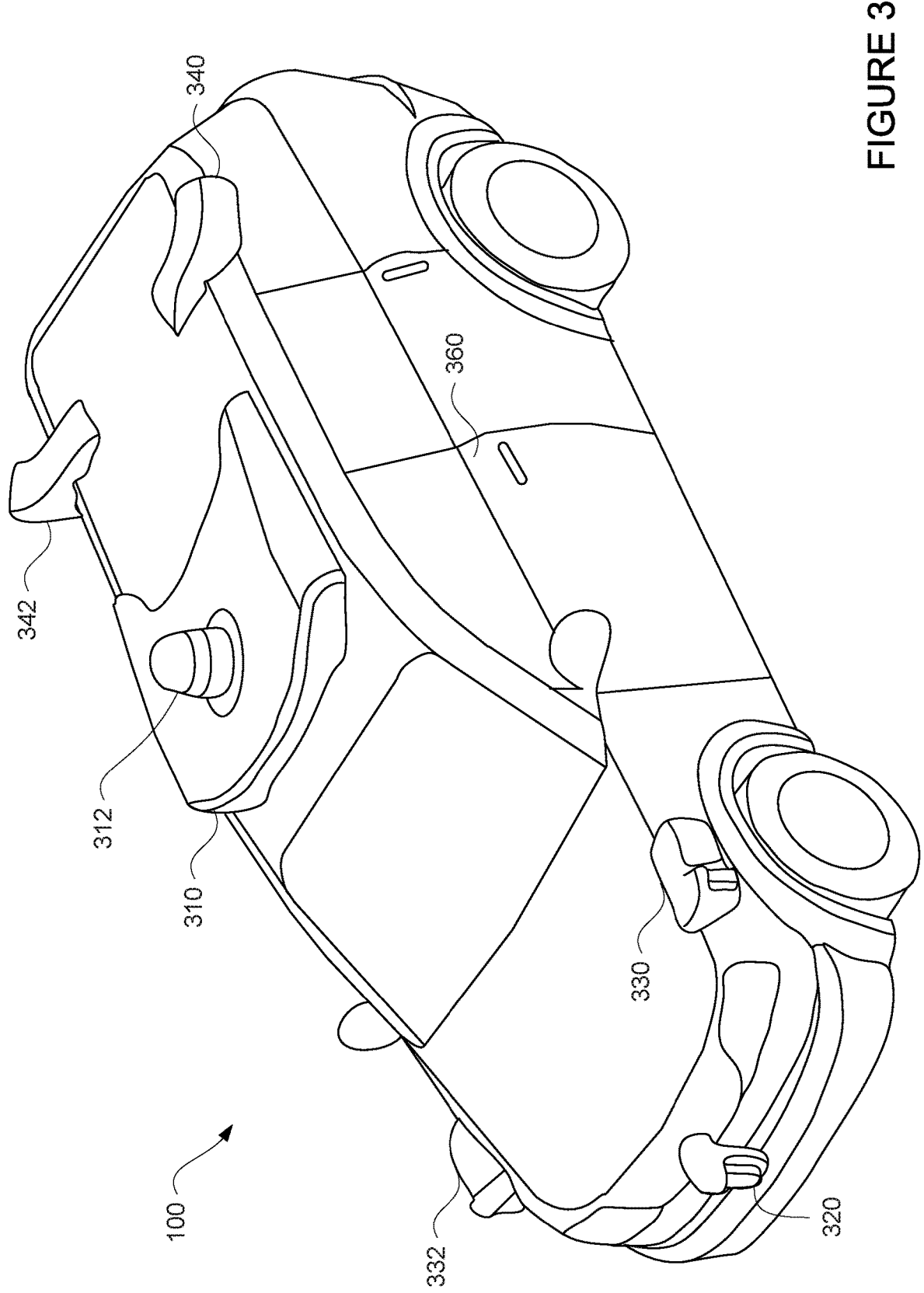
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
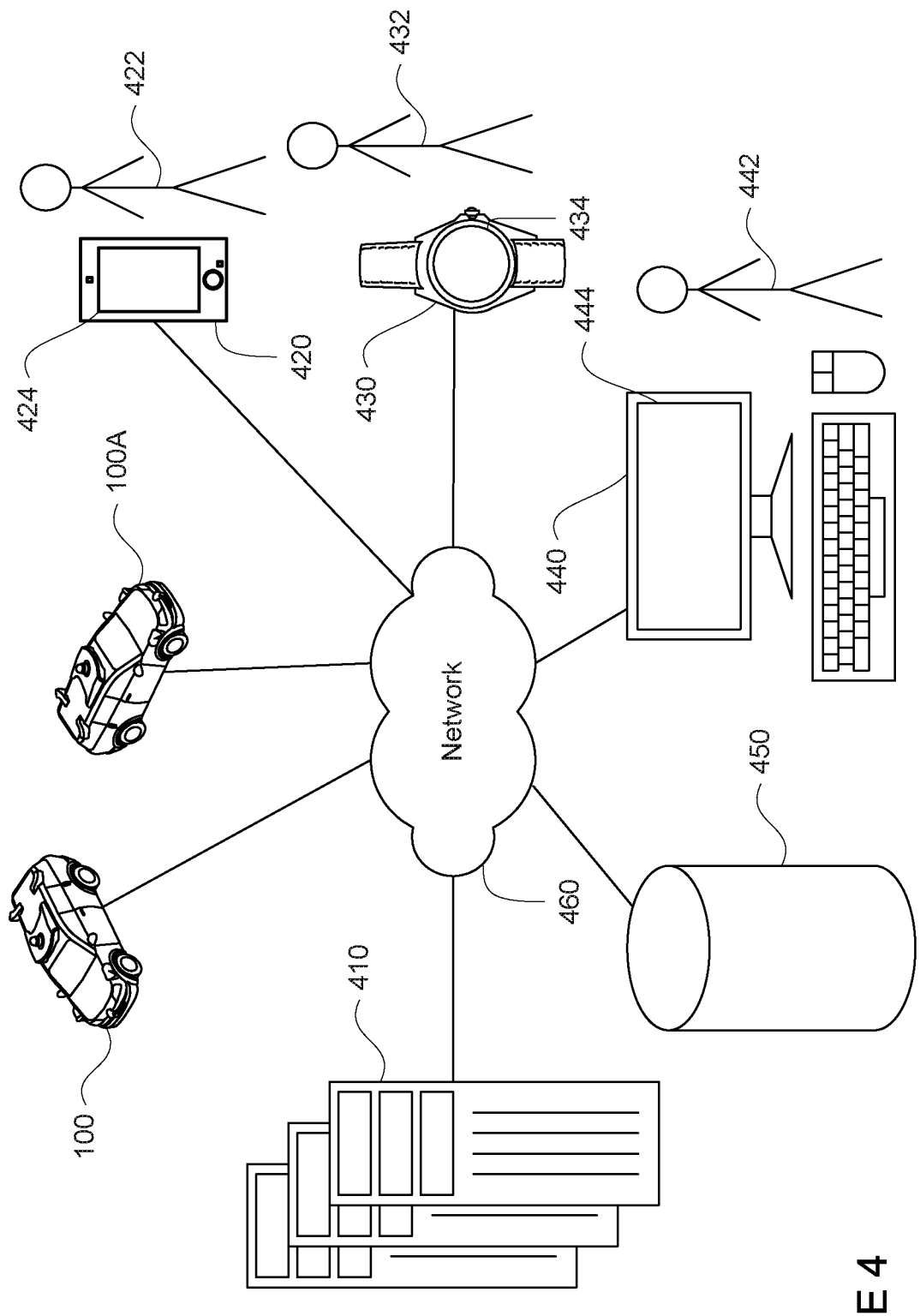
FIG. 4 is a pictorial diagram of an example system in accordance with aspects of the disclosure.
Figure 5:
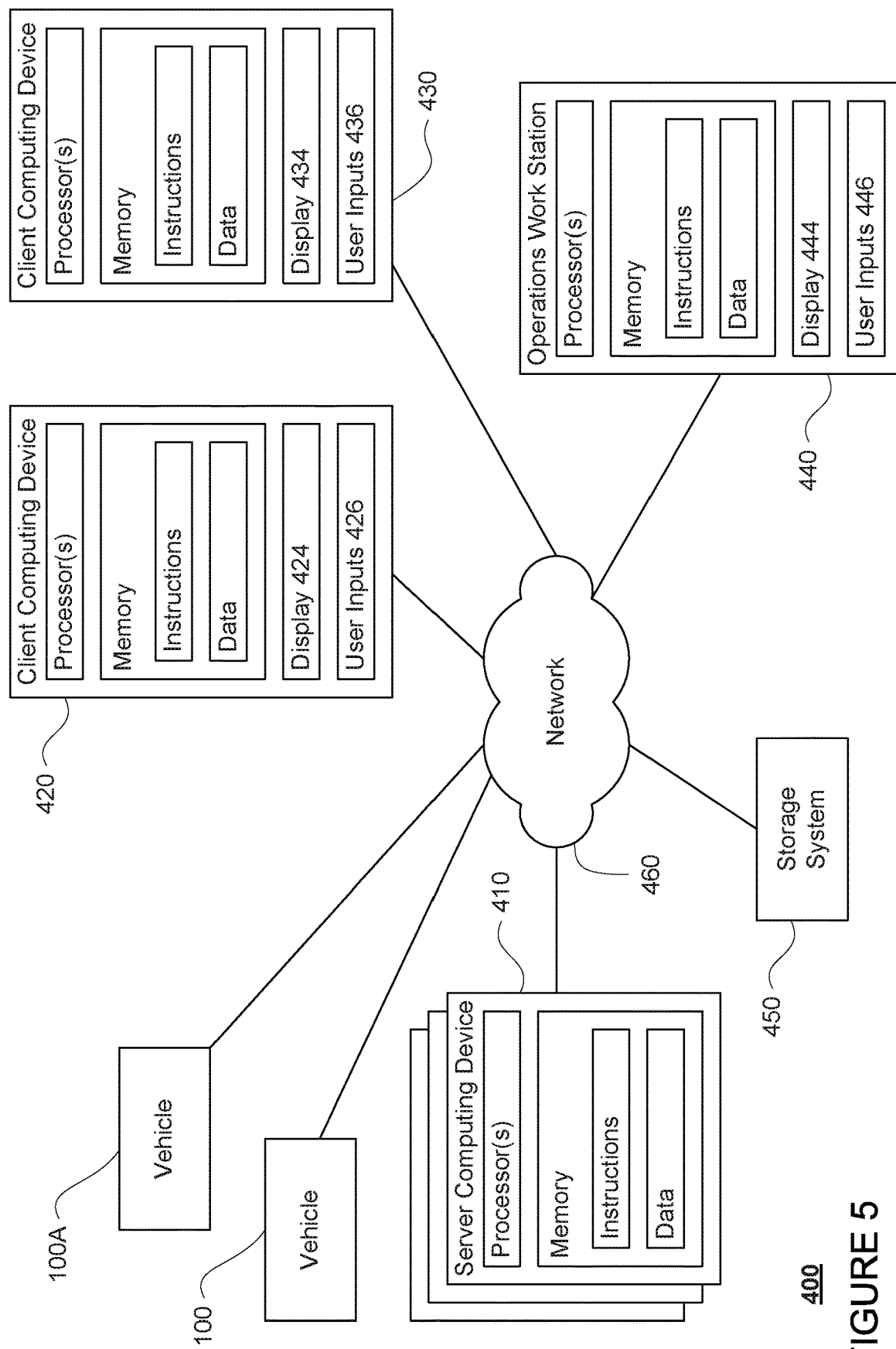
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include, for instance, sensor data generated by a perception system, such as perception system 172 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions with other objects, planned trajectories describing a planned geometry and/or speed for a potential path of the vehicle 100, actual locations of the vehicles at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation.

In addition, the storage system 450 may also store autonomous control software which is to be used by vehicles, such as vehicle 100, to operate a vehicle in an autonomous driving mode. This autonomous control software stored in the storage system 450 may be a version which has not yet been validated. Once validated, the autonomous control software may be sent, for instance, to memory 130 of vehicle 100 in order to be used by computing devices 110 to control vehicle 100 in an autonomous driving mode.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to test and/or validate the autonomous control software which will be stored in memory 130 for use by the computing devices 110 of vehicle 100, the server computing devices 410 may run various simulations. These simulations may be log based simulations that are generated from the information stored in the aforementioned log data of storage system 450. In this regard, the server computing devices 410 may access the storage system 450 in order to retrieve the log data and run a simulation. For instance, a portion of the log data corresponding to a minute in real time of an autonomous vehicle that generated the log data may be retrieved from the storage system. This portion of log data may be "hand" selected by human operators and/or computing devices based on the types of events recorded in the logs or more randomly, for instance, by selecting 1% or more or less of all autonomous driving logs.

The retrieved portion of log data may be used to run an initial simulation. When running the autonomous control software through the portion of log data, the details (sensor data and events) of the log data may be used to generate a simulation. In other words, the sensor data of the portion of log data may simply be "played" as input to the perception system 172 of a simulated vehicle controlled by the autonomous control software. In this regard, the autonomous control software "experiences" or processes the log data as if the autonomous control software was actually being run on vehicle 100. In other words, the simulation may include data defining characteristics of objects such as shape, location, orientation, speed, etc. of objects such as vehicles, pedestrians, bicyclists, vegetation, curbs, lane lines, sidewalks, crosswalks, buildings, etc. defined by the sensor data of the log data. Further, the simulation may include characteristics for a virtual vehicle, corresponding to vehicle 100, including the virtual vehicle's shape, location, orientation, speed, etc. defined by the events of the log data.

Figure 6:
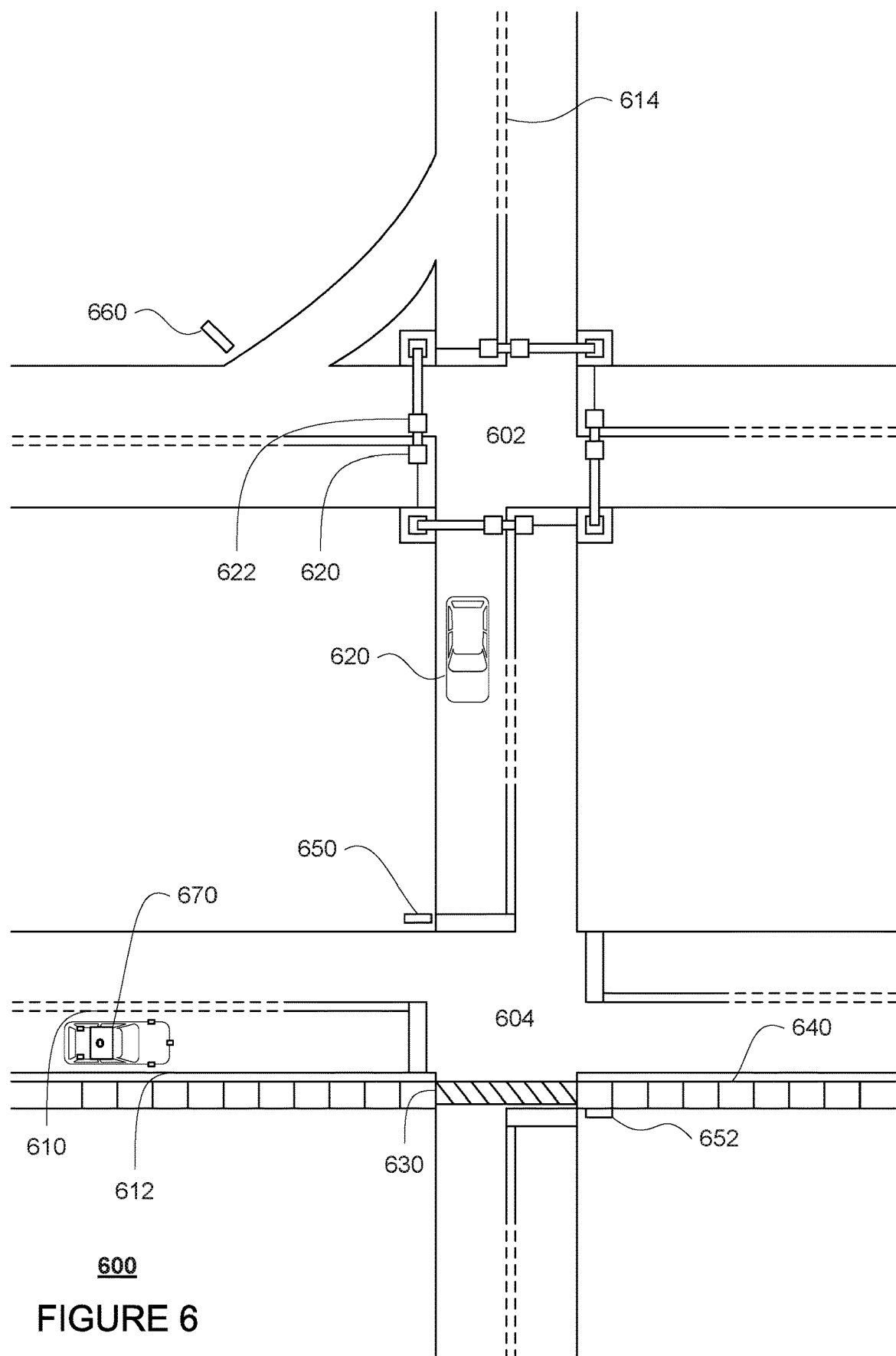
FIG. 6 is an example representation of a simulation in accordance with aspects of the disclosure.

FIG. 6 provides an example 600 of a simulation for a section of roadway corresponding to the map information 200. In this example, intersections 602 and 604 correspond to intersections 202 and 204, respectively. This regard, the shape, location, and other characteristics of lane lines 210, 612, 614, traffic signal lights 620, 622, crosswalk 630, sidewalks 640, stop signs 650, 652, and yield sign 660 corresponds to the shape, location and other characteristics of lane lines 210, 212, 214, traffic signal lights 220, 222, crosswalk 230, sidewalks 240, stop signs 250, 252, and yield sign 260. In example 600, a simulated vehicle 670, corresponding to vehicle 100 or vehicle 100A, is approaching an intersection 604. An agent vehicle 620, generated from sensor data and/or event data from the log data for the simulation, is also approaching intersection 604. This simulation may include the agent vehicle 620 "behaving badly" because vehicle 620 may ignore stop sign 650.

In some instances, the autonomous control software is only provided with information which the perception system 172 would be able to detect about the scenario, and not every detail of the scenario. For instance, returning to example 600, the server computing devices 410 may run the scenario such that the autonomous control software is given access to the detailed map information 200 as well as any information that would be detected by a perception system of the simulated vehicle 670.

The initial simulation may be associated with a "handover time." This handover time may correspond to the time when the autonomous control software is given control of controlling the virtual vehicle within the simulation and allows the simulation to be used to test the autonomous control software. In other words, the autonomous control software is able to use the sensor data in combination with the map information to determine how the virtual vehicle should respond to its environment.

For the "initial" handover time for an initial simulation, a default handover time, such as 5 seconds or more or less into the simulation, may be used. Alternatively, the handover time may be automatically selected for each scenario according to the circumstances of that simulation. In some instances, the handover time may further be confirmed or hand tuned by a human operator, for instance using operations workstation 440. In one example, for a given simulation, if the simulated vehicle collides with another object, such as a vehicle, pedestrian, or bicyclist, in the simulation at some point in the simulation, a second point a few seconds before this expected collision, such as 5 seconds or more or less before the collision, may be selected as the handover time for future uses of that simulation. This handover time may then be confirmed as reasonable or adjusted by a human operator. Using a simpler validation process for handover time with human review reduces unnecessary complications and calculations and can provide more consistent results over larger datasets. For instance, example 600 of FIG. 6 may represent a simulation at handover time.

During or after the running of the initial simulation, the log data may be compared with the results of the simulation in order to determine a divergence point. For instance, a divergence point may be determined by comparing one or more characteristics of the simulated vehicle with one or more characteristics of the actual vehicle (in the example above, vehicle 100) from the log data. In one example, the divergence point may be determined by comparing the planned trajectory of the simulated vehicle with the planned trajectory of the actual vehicle identified in the log data. Each planned trajectory may correspond to a combined speed and geometry of a future path or individual geometry and speed profile components. When one or more of a location, speed or change in speed of the planned trajectories diverge more than some threshold amount over some period of time, this may be considered a divergence point.

However, because of the timing requirement for comparing planned trajectories, at least some divergences may not be identified as points of divergence. As such, the locations of the simulated vehicle in the simulation and the real or actual vehicle that captured the log data may be compared. The first point in time in the simulation at which the locations diverge at least a predetermined threshold, such as 1 meter or more or less, may be identified as a divergence point.

Figure 7:
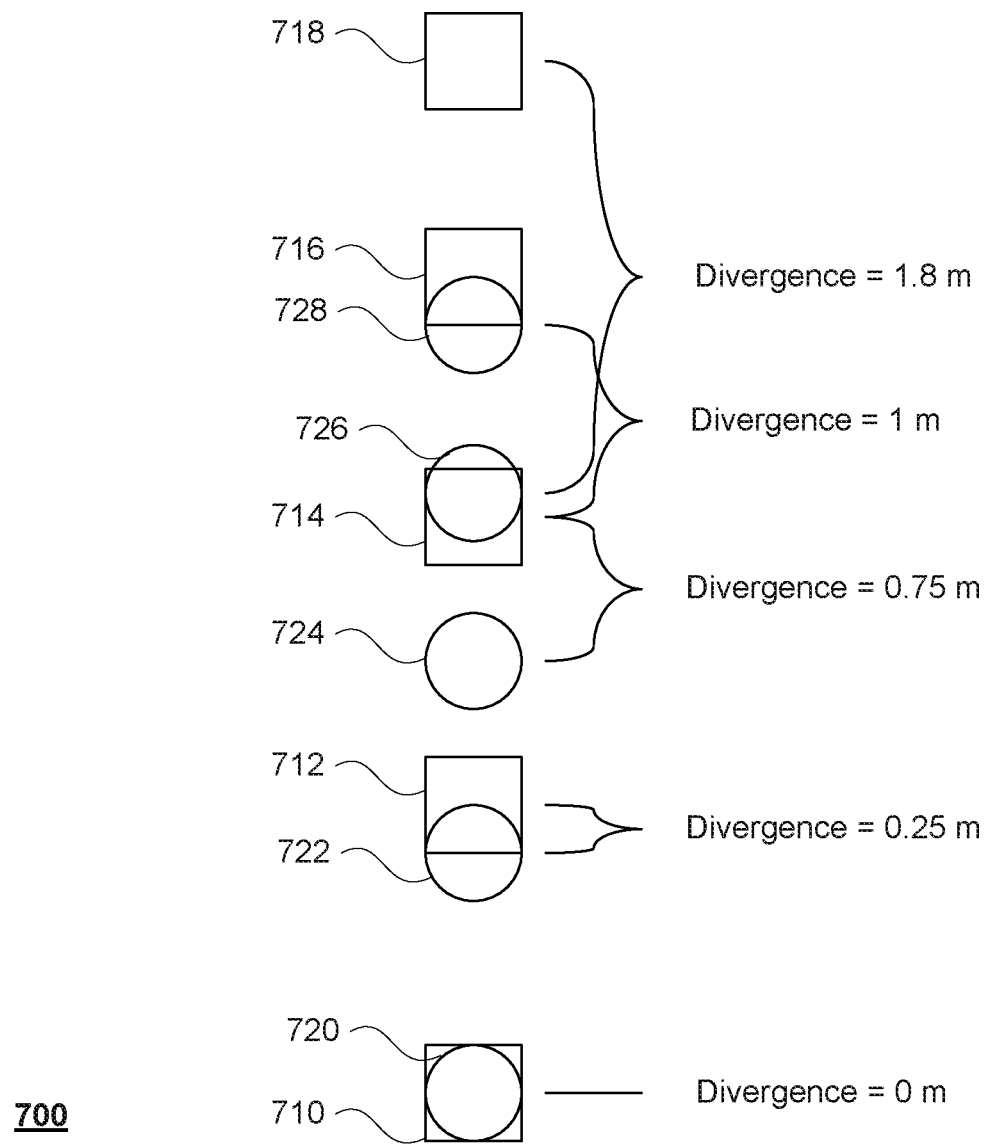
FIG. 7 is an example comparison of log data and simulation results in accordance with aspects of the disclosure.

For instance, FIG. 7 represents an example comparison 700 of log data location for an actual vehicle, identifying locations 710-718 represented by squares and increasing in time from 710 to 718 as well as locations 720-728 of the simulated vehicle represented by circles and increasing in time from 720 to 728. Each of these locations may represent a point in time either in the simulation or the log data. Of course, the simulation may have a simulated clock that corresponds to the clock in the log data in order to allow for the identification of corresponding points in the log data and the simulation. As such, for comparison purposes, location 710 and location 720 correspond to a first point in time, location 712 and 722 correspond to a second point in time, and so on. In this example, a divergence point may be determined when the divergence or difference in distance between these locations is greater than or equal to 1 meter, or for instance, at locations 716 and 726. The time represented by locations 716 and 726 may thus be a divergence point.

In some instances, rather than drawing a "straight line" to determine the divergence point, the divergence point may be measured both laterally (in a lateral direction) and longitudinally (in a longitudinal direction) relative to a direction of traffic or travel of a lane in which the vehicle is currently traveling. In this example, lateral divergence may be treated differently than longitudinal divergence as it may be less interesting that the simulated vehicle is moving faster or slower than the actual vehicle did as compared to whether the simulated vehicle is moving to the left or right with respect to a lane. An example of thresholds may include meeting one or both of a 1 meter or more or less lateral divergence and a 3 meter or more or less longitudinal divergence.

In order to make better use of the log data for simulations, the simulations may be "adjusted" based on how much the behavior of a simulated vehicle diverges from the behavior of the actual vehicle that was used to log the log data. For instance, the handover time or the point in which the software is given control of the simulated vehicle may be adjusted. In other words, simulations may be run identically as to how an actual vehicle drove in the log data up until some divergence point between a simulated vehicle in a simulation and the actual vehicle that captured the log data.

The retrieved portion of log data may be used to run a new or second simulation. The second simulation may run using the software to control a second simulated vehicle. The divergence point from the first or prior simulation may be used to determine a handover time for the second simulation to allow the software to take control of the second simulated vehicle. In other words, the new simulation forces the simulated vehicle to wait until at least the divergence point before changing its position, speed, orientation, heading, etc. from the log data. In one example, the divergence point may be used as the handover time for the second simulation. Alternatively, a period of time, such as 5 seconds or more or less, may be added to the divergence point to determine the handover time. The duration of the period of time may be adjustable. For instance, a smaller number would provide more detailed information, though at the expense of greater computational resource requirements (i.e. more simulations would require more resources).

As another alternative, a minimum difference may be used. For instance, the handover time for a new simulation may be determined from the maximum of the divergent point and some minimum period of time from the handover time in the prior simulation. This minimum period of time may be, for instance 5 seconds or more or less, and may also be adjusted as discussed above. By using a minimum period of time, the computing devices may avoid creating an excessive number of simulations in some part of the log data that is just very susceptible to divergence.

Figure 8:
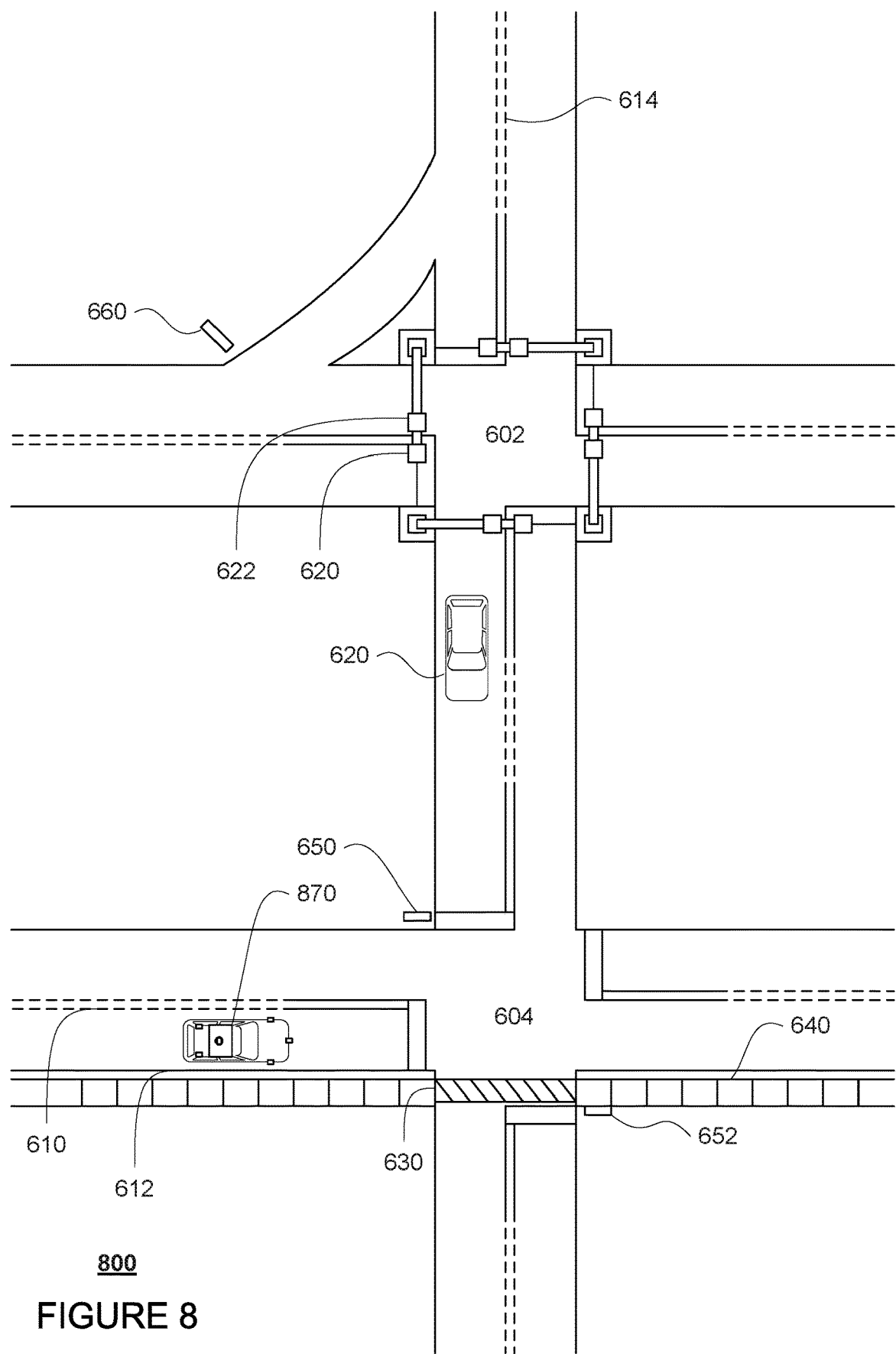
FIG. 8 is an example representation of a simulation in accordance with aspects of the disclosure.

For instance, FIG. 8 may represent an example 800 of a simulation corresponding to the simulation of example 600. Again, in example 800, a simulated vehicle 870, corresponding to vehicle 100 or vehicle 100A, is approaching an intersection 604. However, in this example, the handover time may be determined from the divergence point of example 700, or for instance, locations 716 and 726 of example 700. Again, the time of locations 716 and 726 may be used as the handover time for the second simulation or some fixed period of time may be added to the times of locations 716 and 726 to determine the handover time. Again, example 800 of FIG. 8 may represent a second simulation at the handover time for the second simulation.

The server computing devices 110 may monitor and/or analyze the results of the second simulation in order to determine whether a particular type of event has occurred during the second simulation. In other words, the server computing devices are able to determine whether the software is able to complete the second simulation without the particular type of event occurring. For instance, the server computing devices may determine whether the simulated vehicle exhibits a particular type of maneuvering behavior, such as swerving, harsh braking, and/or colliding with another object of the log data. If the particular type of event does or has occurred, then the new simulation may be flagged for review by an operator.

At the same time, a new or second divergence point may be determined for this second simulation as discussed above. A third simulation may be run. The second divergence point may be used to determine a handover time for the third simulation as discussed above. Again, the server computing devices 110 may monitor and/or analyze the results of the third simulation in order to determine whether a particular type of event has occurred during the third simulation. At the same time, a third divergence point may be determined for this third simulation as discussed above. A fourth simulation may be run. The third divergence point may be used to determine a handover time for the fourth simulation as discussed above, and so on.

Figure 9:
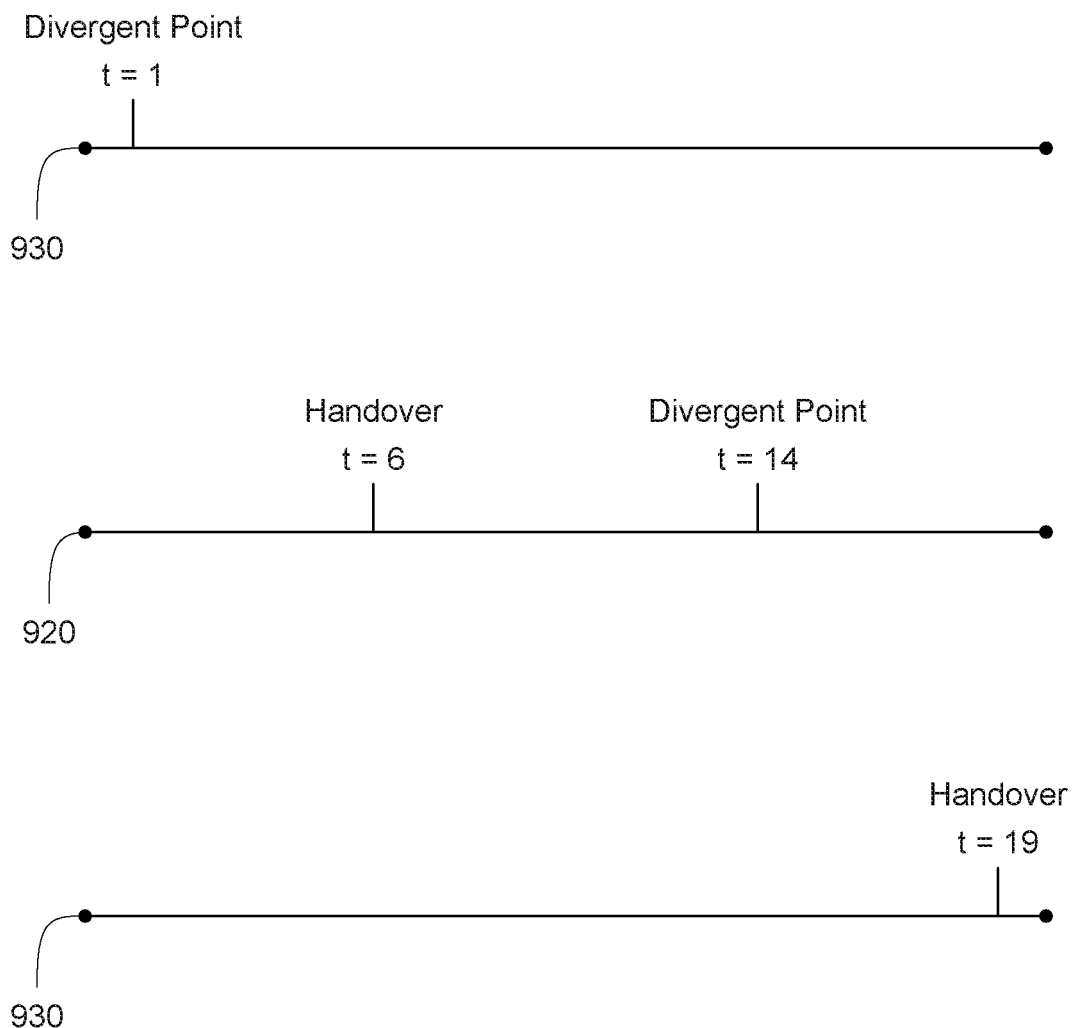
FIG. 9 is an example representation of simulations and handover times in accordance with aspects of the disclosure.

This process may be repeated until there are no additional points of divergence between the simulated vehicles and the actual vehicle that captured the log data over the course of the simulation and/or until the handover time would go beyond the duration of the original simulation. For instance, turning to example 900 of FIG. 9, timelines of first, second, and third simulations 910, 920, 930 are represented. If a divergence point for a first simulation 910 occurs at t=1.0 s, a second simulation 920 may be started with a handover time 922 five seconds after the divergence point, for instance, at t=6.0 s. If that second simulation has a divergence point at t=14.0 s, then a third simulation 930's handover time may be set to t=14.0 s (using the example of the handover time being determined from the maximum of the divergent point and some minimum period of time from the handover time in the prior simulation). Once there is no divergence point during the duration of the original simulation (i.e. if there was a divergence point, it would occur after the duration of the original simulation), the process may be terminated.

In addition, to make later simulations "cheaper" in terms of computational resource costs, when triggering a new simulation, the new simulation may reuse the output of the perception system for the virtual vehicle. This is possible because what the simulated vehicle's perception system will "detect" in the simulation does not necessarily change when the position, location, orientation of the simulated vehicle changes with respect to the actual vehicle that captured the log data.

Figure 10:
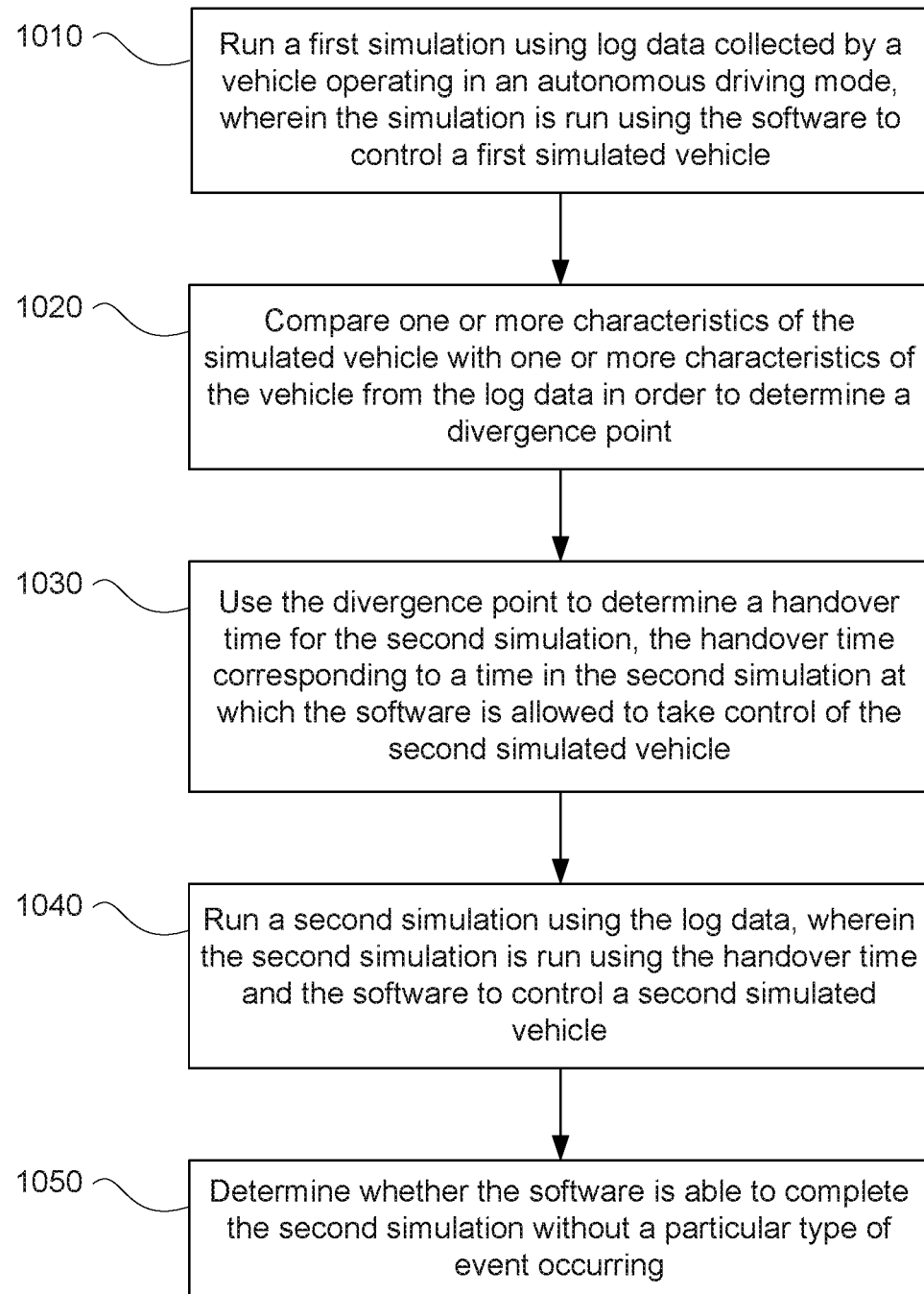
FIG. 10 is an example flow diagram in accordance with aspects of the disclosure.

FIG. 10 includes an example flow diagram 1000 of some of the examples for testing software for operating a vehicle in an autonomous driving mode, which may be performed by one or more processors such as processors of computing devices 410. For instance, at block 1010 a first simulation is run using log data collected by a vehicle operating in an autonomous driving mode. The simulation is run using the software to control a first simulated vehicle. At block 1020, one or more characteristics of the simulated vehicle are compared with one or more characteristics of the vehicle from the log data in order to determine a divergence point. At block 1030, the divergence point used to determine a handover time for the second simulation. The handover time corresponds to a time in the second simulation at which the software is allowed to take control of the second simulated vehicle. At block 1040, a second simulation is run using the log data. The second simulation is run using the software to control a second simulated vehicle (or rather the simulated vehicle of the second simulation) and using the divergence point as a handover time to allow the software to take control of the second simulated vehicle. At block 1050, whether the software is able to complete the second simulation without a particular type of event occurring is determined.

Figure 11:
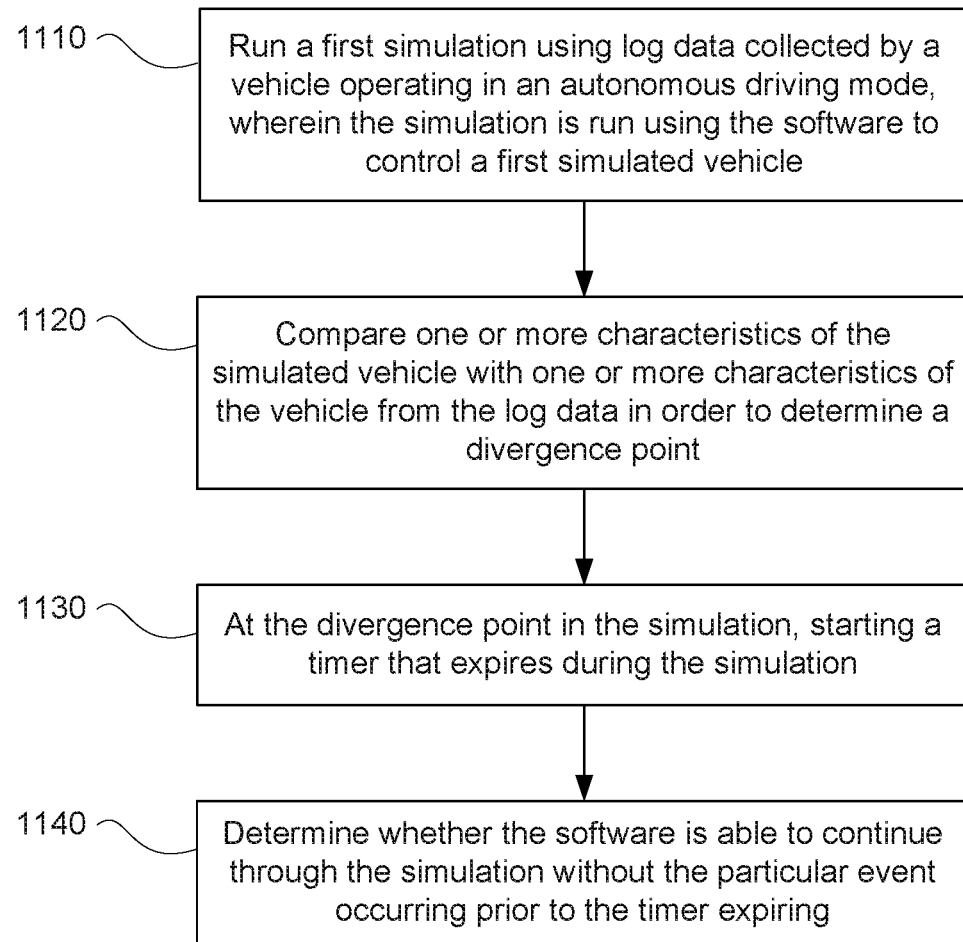
FIG. 11 is another example flow diagram in accordance with aspects of the disclosure.

In addition or alternatively, once the divergence point is identified in a simulation, a timer may be started. For instance, this timer may be 5 seconds of time in the simulation (which may run faster than real time) or more or less. After the timer expires, certain events may be ignored. For instance, if simulations are being analyzed to determine when the software is likely to cause the vehicle to behave or maneuver in a particular way (such as swerving or changing lanes, etc.) or collide or nearly collide with another agent or object, and such events occur after the timer expires, these events more likely to be caused by the other agents in the simulation rather than the software. The timer may help to determine how likely an event is to be caused by software versus another agent in the simulation. In other words, such events that occur before the timer has expired are more likely to be caused by the software than other agents in the simulation. Similarly, such events that occur after the timer has expired may be more likely to be caused by other agents in the simulation than the software. As such, these events that occur after the timer has expired may be ignored, or not flagged, or flagged, but with lower priority to avoid unnecessary review of simulations with collisions caused by agents rather than the software. FIG. 11 includes an example flow diagram 1100 of some of the examples for testing software for controlling a vehicle in an autonomous driving mode, which may be performed by one or more processors such as processors of computing devices 410. For instance, at block 1110, a simulation is run using log data collected by a vehicle operating in an autonomous driving mode. The simulation is run using the software to control a first simulated vehicle. At block 1120, one or more characteristics of the simulated vehicle are compared with one or more characteristics of the vehicle from the log data in order to determine a divergence point. At block 1130, a timer that expires during the simulation is started at the divergence point in the simulation. At block 1140, whether the software is able to continue through the simulation without the particular event occurring prior to the timer expiring is determined.

Figure 12:
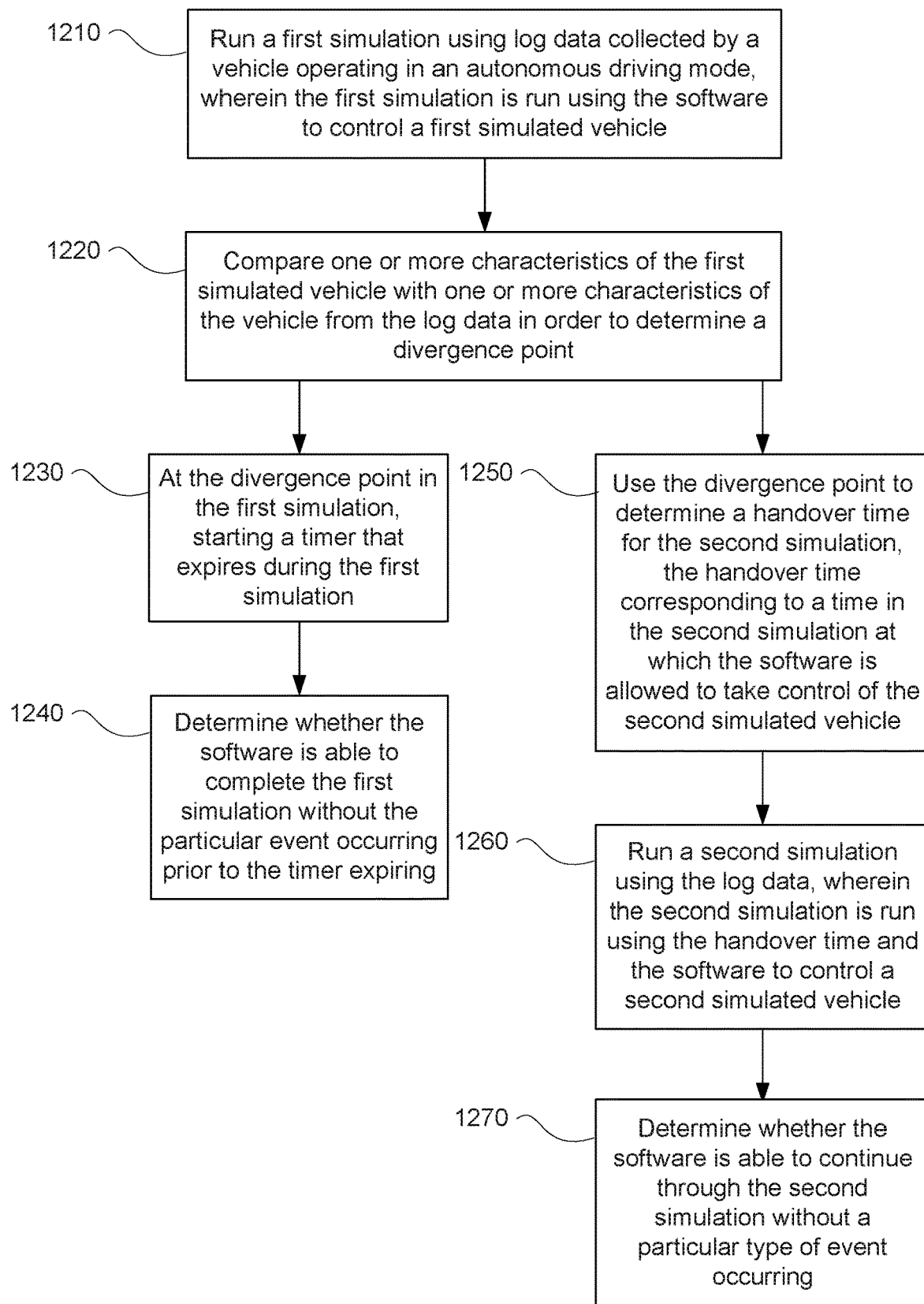
FIG. 12 is a further example flow diagram in accordance with aspects of the disclosure.

FIG. 12 includes an example flow diagram 1200 of some of the examples for testing software for controlling a vehicle in an autonomous driving mode, which may be performed by one or more processors such as processors of computing devices 410. For instance, at block 1210, a first simulation is run using log data collected by a vehicle operating in an autonomous driving mode. The first simulation is run using the software to control a first simulated vehicle. At block 1220, during the running of the first simulation, one or more characteristics of the first simulated vehicle are compared with one or more characteristics of the vehicle from the log data in order to determine a divergence point. At block 1230, a timer that expires during the simulation is started at the divergence point. At block 1240, whether the software is able to continue through the first simulation without the particular event occurring prior to the timer expiring is determined. At block 1250, the divergence point is used to determine a handover time for a second simulation. The handover time corresponds to a time in the second simulation at which the software is allowed to take control of the second simulated vehicle. At block 1260, a second simulation is run using the log data. The second simulation is run using the software to control a second simulated vehicle and using the divergence point as a handover time to allow the software to take control of the second simulated vehicle. At block 1270, whether the software is able to complete the second simulation without a particular type of event occurring is determined. Again this process may be continued in a loop as described above.

Again, the features described herein provide for a safe, effective, and realistic way of testing software for autonomous vehicles. For instance, the software can be tested in hundreds of thousands of scenarios without endangering the life and property of actual persons. At the same time, by making the handover time for a new simulation a divergence point corresponding to a divergence point of a prior simulation, this prevents the simulated vehicle from inadvertently making the simulation less useful. In addition, this approach effectively provides for more realistic responses of the software being tested as well as more valuable and useful simulations out of a fixed amount of log data. In addition, using a timer to determine whether to flag a simulation for review may reduce the time and other resources required to review simulations that are not actually true "fails". In addition, those simulations that are flagged may be more critically important to determining how to revise or update the software being tested. Without such testing, the risks of injury to persons or property using un-tested software may be too great.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for testing software for operating a vehicle in an autonomous driving mode, the system comprising one or more processors configured to:
   run a first simulation using log data collected by a vehicle operating in an autonomous driving mode, wherein the first simulation is run using the software to control a first simulated vehicle;
   compare one or more characteristics of the first simulated vehicle with one or more characteristics of the vehicle from the log data in order to determine a divergence point;
   use the divergence point to determine a handover time for a second simulation, the handover time corresponding to a time in the second simulation at which the software is allowed to take control of a second simulated vehicle of the second simulation;
   run the second simulation using the log data, wherein the second simulation is run using the handover time and the software to control the second simulated vehicle; and
   determine whether the software is able to complete the second simulation without a particular type of event occurring in the second simulation.

2. The system of claim 1, wherein the particular type of event is a collision, and the one or more processors are further configured to flag the second simulation for further review when a collision is determined to have occurred.

3. The system of claim 1, wherein, as a part of determining the divergence point, the one or more processors are further configured to compare a planned trajectory of the first simulated vehicle with a planned trajectory of the vehicle from the log data.

4. The system of claim 3, wherein, as a part of determining the divergence point, the one or more processors are further configured to determine when one or more of a location, speed or change in speed of the planned trajectory of the first simulated vehicle and the planned trajectory of the vehicle from the log data diverge more than some threshold amount over some period of time.

5. The system of claim 1, wherein, as a part of determining the divergence point, the one or more processors are further configured to determine when a location of the first simulated vehicle and a location of the vehicle from the log data diverge more than a threshold amount.

6. The system of claim 1, wherein, as a part of determining the divergence point, the one or more processors are further configured to determine when a location of the first simulated vehicle and a location of the vehicle from the log data diverge more than a threshold amount in a lateral direction relative to a direction of traffic in a lane in which the simulated vehicle is traveling in the first simulation.

7. The system of claim 1, wherein, as a part of determining the divergence point, the one or more processors are further configured to determine when a location of the first simulated vehicle and a location of the vehicle from the log data diverge more than a threshold amount in a longitudinal direction relative to a direction of traffic in a lane in which the simulated vehicle is traveling in the first simulation.

8. The system of claim 7, wherein, as a part of determining the divergence point, the one or more processors are further configured to determine when the location of the first simulated vehicle and the location of the vehicle from the log data diverge more than a threshold amount in a lateral direction relative to the direction of traffic in the lane.

9. The system of claim 1, wherein the one or more processors are further configured to:
at the divergence point in the first simulation, start a timer that expires during the first simulation; and
flag the first simulation for review when the particular type of event occurs before the timer expires.

10. The system of claim 9, wherein the one or more processors are further configured to not flag the first simulation for review if the particular type of event only occurs during the first simulation after the timer expires.

11. The system of claim 9, wherein the particular type of event is a collision between the first simulated vehicle and an object in the first simulation.

12. The system of claim 9, wherein the particular type of event includes the simulated vehicle exhibiting a particular type of maneuvering behavior.

13. A system for testing software for operating a vehicle in an autonomous driving mode, the system comprising one or more processors configured to:
run a simulation using log data collected by a vehicle operating in an autonomous driving mode, wherein the simulation is run using the software to control a simulated vehicle;
compare one or more characteristics of the simulated vehicle with one or more characteristics of the vehicle from the log data in order to determine a divergence point;
at the divergence point in the simulation, start a timer that expires during the simulation; and
determine whether the software is able to continue through the simulation without a particular event occurring in the simulation prior to the timer expiring.

14. The system of claim 13, wherein the particular event is a collision between the simulated vehicle and an object in the simulation.

15. The system of claim 13, wherein the one or more processors are further configured to flag the simulation for review if the particular event occurs before the timer expires.

16. The system of claim 13, wherein the one or more processors are further configured to not flag the simulation for review if the particular event only occurs during the simulation after the timer expires.

17. The system of claim 15, wherein the particular event is a collision between the simulated vehicle and an object in the simulation.

18. The system of claim 13, wherein the particular event includes the simulated vehicle exhibiting a particular type of maneuvering behavior.

19. The system of claim 13, wherein, as a part of determining the divergence point, the one or more processors are further configured to determine when a location of the simulated vehicle and a location of the vehicle from the log data diverge more than a threshold amount.

20. The system of claim 13, wherein, as a part of determining the divergence point, the one or more processors are further configured to determine when a location of the simulated vehicle and a location of the vehicle from the log data diverge more than a threshold amount in at least one of a lateral direction or a longitudinal direction relative to a direction of traffic in a lane in which the simulated vehicle is traveling in the simulation.

* * * * *